(12) United States Patent
Onteddu et al.

(10) Patent No.: US 10,078,316 B2
(45) Date of Patent: Sep. 18, 2018

(54) PRE-CONFIGURATION AND INTEGRATION OF IEDS IN SUBSTATION AUTOMATION SYSTEMS

(71) Applicant: Honeywell International Inc., Morristown, NJ (US)

(72) Inventors: Siva Onteddu, Horsham, PA (US); Michael Baker, Perkasie, PA (US); Senthilkumar Dhanagopalan, Karnataka (IN); Girish Krishnanivas, New Delhi (IN)

(73) Assignee: Honeywell International Inc., Morris Plains, NJ (US)

( * ) Notice: Subject to any disclaimer, the term of this patent is extended or adjusted under 35 U.S.C. 154(b) by 412 days.

(21) Appl. No.: 14/843,501

(22) Filed: Sep. 2, 2015

(65) Prior Publication Data

US 2017/0063085 A1    Mar. 2, 2017

(51) Int. Cl.
  *G05B 15/02* (2006.01)
  *H02J 3/00* (2006.01)
  *H02H 7/26* (2006.01)

(52) U.S. Cl.
  CPC ............ *G05B 15/02* (2013.01); *H02H 7/261* (2013.01); *Y02E 60/723* (2013.01); *Y04S 10/16* (2013.01)

(58) Field of Classification Search
  CPC ................................ G05B 15/02; H02H 7/261
  See application file for complete search history.

(56) References Cited

U.S. PATENT DOCUMENTS

| 2010/0169876 A1* | 7/2010 | Mann ........................ G06F 8/65 |
| | | 717/170 |
| 2012/0233296 A1 | 9/2012 | Wimmer |
| 2012/0239170 A1* | 9/2012 | Kulathu ............. G05B 19/0426 |
| | | 700/83 |
| 2013/0031164 A1* | 1/2013 | Sundaram .............. H02H 7/261 |
| | | 709/203 |

\* cited by examiner

*Primary Examiner* — Tri Hoang
(74) *Attorney, Agent, or Firm* — Anthony Miologos

(57) ABSTRACT

A method of configuring actual Intelligent Electronic Devices (IEDs) into a substation automation system (SAS) of a power system that runs a substation process. An IED data repository stores IED information including a plurality of logical node classes (LNs), where each LN includes a plurality of data objects as LN type definitions that represent at least bay level functions including control and monitoring outputs from the primary devices or protecting the primary devices. Using an LN type generator, selection of LNs is performed from the plurality of LNs based on functions for implementing at least one single line diagram (selected LNs) that represents the SAS. From the selected LNs a pre-configured IED strategy is generated to represent at a first actual IED to control and automate the substation process in a format understood by the SAS. The pre-configured IED strategy is saved into the IED data repository.

14 Claims, 4 Drawing Sheets

PRE-CONFIGURATION AND INTEGRATION OF IEDS IN SUBSTATION AUTOMATION SYSTEMS

FIELD

Disclosed embodiments relate to substation automation systems for power systems.

BACKGROUND

Industrial facilities use communication networks to transmit and receive information and data. The industrial facilities can include various industries and applications such as process or industrial manufacturing, building automation, substation automation, and automatic meter reading. The communication networks can use a variety of communication network protocols. Several protocols have been developed for power system automation.

Substations in high and medium-voltage power networks include primary devices such as electrical cables, lines, bus bars, switches, power transformers and instrument transformers, which are generally arranged in switch yards and/or bays. These primary devices are operated in an automated way via a Substation Automation system (SAS). The SAS includes secondary devices, so-called Intelligent Electronic Devices (IED) which are responsible for protection, control and monitoring of the primary devices.

The IEDs may be assigned to hierarchical levels, for example 3 levels being the station level (upper level), the bay level (middle level), and the process level (lower level), the process level being separated from the bay level by a so-called process interface. FIG. 1 shows a conventional SAS 100 configured into 3 hierarchical functional levels. The levels shown include a station level (top level) 130 with a Human-Machine Interface (HMI) 136 connected to a station 134 (typically a computing device) providing a user interface, as well as the gateway 131 connecting the control center 135 (e.g., having process controllers) of the SAS 100 which includes one or more process controllers to the IEDs in the bay level 120 shown as IED1 (from) Vendor 1 121, IED2 (from) Vendor 2 122, and IEDn (from) Vendor n 123 via the station bus 125. The HMI 136 is coupled for user monitoring of the IEDs 121-123.

The IEDs 121-123 comprise electronic sensors for sensing voltage, and current protection, for control and measurement of the primary devices 111, 112, 113 (e.g., electrical cables, lines, bus bars, switches, power transformers and instrument transformers) in the process level 110, connected by a process bus 115 through process interfaces 116, 117 and 118. A control center 135 is shown which is connected via the gateway 131 to the IEDs 121-123. A system configuration tool 140 is shown connected to an IED tool (1 . . . n) block 132 that represents a plurality of IED tools (1 . . . n) for configuring the IEDs 121-123 from the different vendors. IEDs can also be located at level 1 or at level 3.

The IEC 61850 standard from the International Electrotechnical Commission (IEC) is a standard for communication networks and systems in a SAS, which recommends interoperability amongst devices from various manufacturers/vendors using common engineering models, data formats and communication protocol. The IEC 61850 protocol standard for SAS enables the integration of all protection, control, measurement and monitoring functions by one common protocol. The IEC 61850 protocol provides high-speed substation applications, station wide interlocking and other functions which need intercommunication between the devices. All IEC 61850 compliant devices connected to the SA network are called IEDs that perform the required functions (protection, local and remote monitoring and control, etc.).

In order to allow free allocation of functions to IEDs from different vendors such as for SAS 100 to support interoperability and confirm the operation functions (protection, local and remote monitoring and control, etc.) of the substation, the IEC 61850 communication standard has formally defined all known functions of a SAS which are modeled into logical nodes (LNs) that are grouped and arranged under different logical devices. Logical Devices (LDs) are virtual devices that exist to enable aggregation of LNs performing similar functions. The LN is the part of an IED that represents a function in the IED including protection, control, monitoring and metering functions of different substation equipment, which communicates with other LNs that may be implemented in a separate IED from different vendors and at a different level.

IEC 61850-6 has defined Extensible Markup Language (XML)-based Substation Configuration description language (SCL), to integrate the LNs of IEDs to the substation structure and to accomplish interoperable engineering data exchange for distributed substation automation system by using configuration tools and integration tools of different manufacturers. The SCL file is used as a standard to build a SAS.

Although each IED conforms to the IEC 61850 standard and all IEC 61850 compliant engineering tools are intended to be interoperable, each IED must be configured via its own proprietary configuration tool to generate the IED capability description (ICD) file as an input to system engineering. Due to this requirement, SAS integration and engineering is heavily dependent on proprietary configuration tools from IED vendors. Despite functionality (indicated in single-line diagrams) of the substation and the protection and control functions of the SAS being available through system specification and the IEC 61850 standard formally defining the functions in a standardized way using LNs with Systems Specification Descriptions (SSDs), system engineering is unable to start system configuration without having the specific ICD files of the IED types. This is because the IEDs vary based on provided functionality and data objects in terms of LNs, and no standard IED capability templates files are readily available. Accordingly, proprietary IED vendor specific configuration tools are required to configure the ICD template files for each IED type. Some IED configuration tools also require an additional license for configuration.

Furthermore, if the system integrator goes with a specific IED type where each IED type varies based on provided functionality and data objects in terms of LNs, this limits the flexibility to find proper IED type to configure the required functions available from multiple vendor IED types in a cost optimal way if all required functionality is not covered by the selected IED types. Despite the use of proprietary IED vendor specific configuration tools, a large amount of manual effort is, however, required for interactions between functions from IED types during initial planning and designing. Furthermore, additional configuration effort is required if the version of the ICD file that was used in system engineering is different from connected IED versions which can result in increased re-commissioning effort and faults during system operation.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments create, simulate and integrate Intelligent Electronic Devices (IEDs) (e.g., IEC 61850 compliant IEDs) within a substation automation system (SAS) and process controller without having the actual IED capability description (ICD) files. The creation and simulation of the IEDs is achieved with built-in functions developed according to an electrical substation automation standard, such as the IEC 61850 standard.

One disclosed embodiment is a method of configuring actual IEDs into a SAS of a power system that runs a substation process. A memory hosts an IED data repository containing information including a plurality of logical node classes (LNs), with each LN including a plurality of data objects as LN type definitions that represent at least bay level functions including to control and monitor outputs from the primary devices and for protecting the primary devices. The data objects of the LN represent the operational parameters, device status, diagnostic information, or device configuration information described by signal lists of substation automation.

Each data object is associated with one stored common data class which describes the data type such as integer, String, Boolean etc. according to an electrical substation automation standard, such as the IEC 61850 standard. The LNs along with its plurality of data objects as LN type definitions are stored into the IED data repository, and these are used to pre-configure IED strategy which represents the actual IEDs used to control and automate the substation process. Using a disclosed LN Type Generator, based on functions identified at least one Single Line Diagram of the SAS a user can select the LNs from a list of available LNs stored in the IED data repository, or a plurality of LNs are automatically selected (selected LNs) based on the functions identified in the Single Line Diagram(s) to create a pre-configured IED strategy in a format understood by the SAS (e.g., EXtensible Markup Language (XML) file, text file, or binary file).

DETAILED DESCRIPTION

Figure 1:
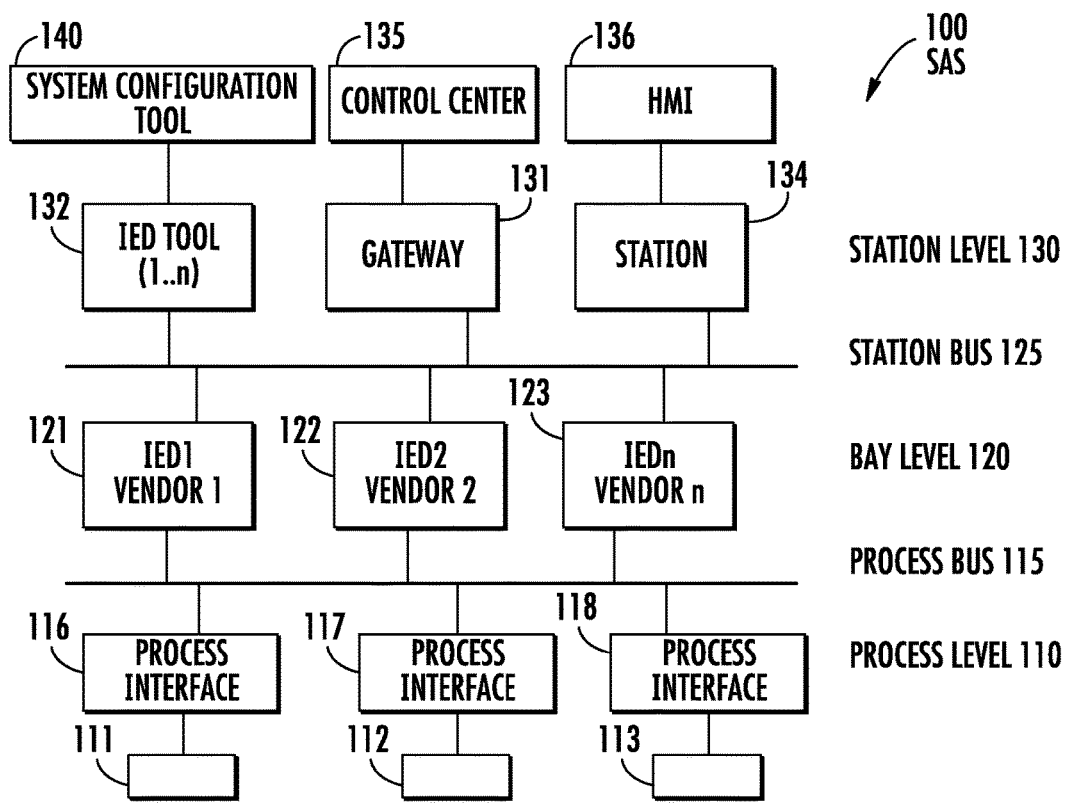
FIG. 1 shows a conventional example SAS configured into 3 hierarchical functional levels for control and monitoring of a substation.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

Disclosed solutions provide an apparatus, system and method to start the system engineering of a substation of a power system without having the specific device vendor's IED capability description (ICD) files of the different IED types from different IED vendors. Disclosed embodiments include an IED data repository which stores a plurality of LNs, each LN having a plurality of data objects as LN type definitions. The data objects of the LN represent the operational parameters, device status, diagnostic information, or device configuration information described by signal lists of substation automation. Each data object is associated with one stored common data class describing data types such as integer, String, Boolean, etc. according to an electrical substation automation standard, such as the IEC 61850 standard. A tool referred to herein as an "LN Type Generator" (see LN type generator 322 in FIGS. 3 and 5 described below) is provided allows LN selection from the LNs in the IED data repository to allow a user or automatic selection of the LNs needed to support the required functions based on one or more single line diagrams of the SAS.

Regarding single line diagrams, any power system even though they are three-phase circuits can be represented by a single line diagram, showing various electrical components of power system and their interconnection. In a single line representation of substation the electrical components such as power transformers, incoming and outgoing lines, bus-bars, switching and protecting equipment, are represented by standard symbols and their interconnections between them are shown by lines, including incoming lines, bus-bar(s), and outgoing lines. Single line diagrams are useful in planning and representing substation layouts.

Figure 2:
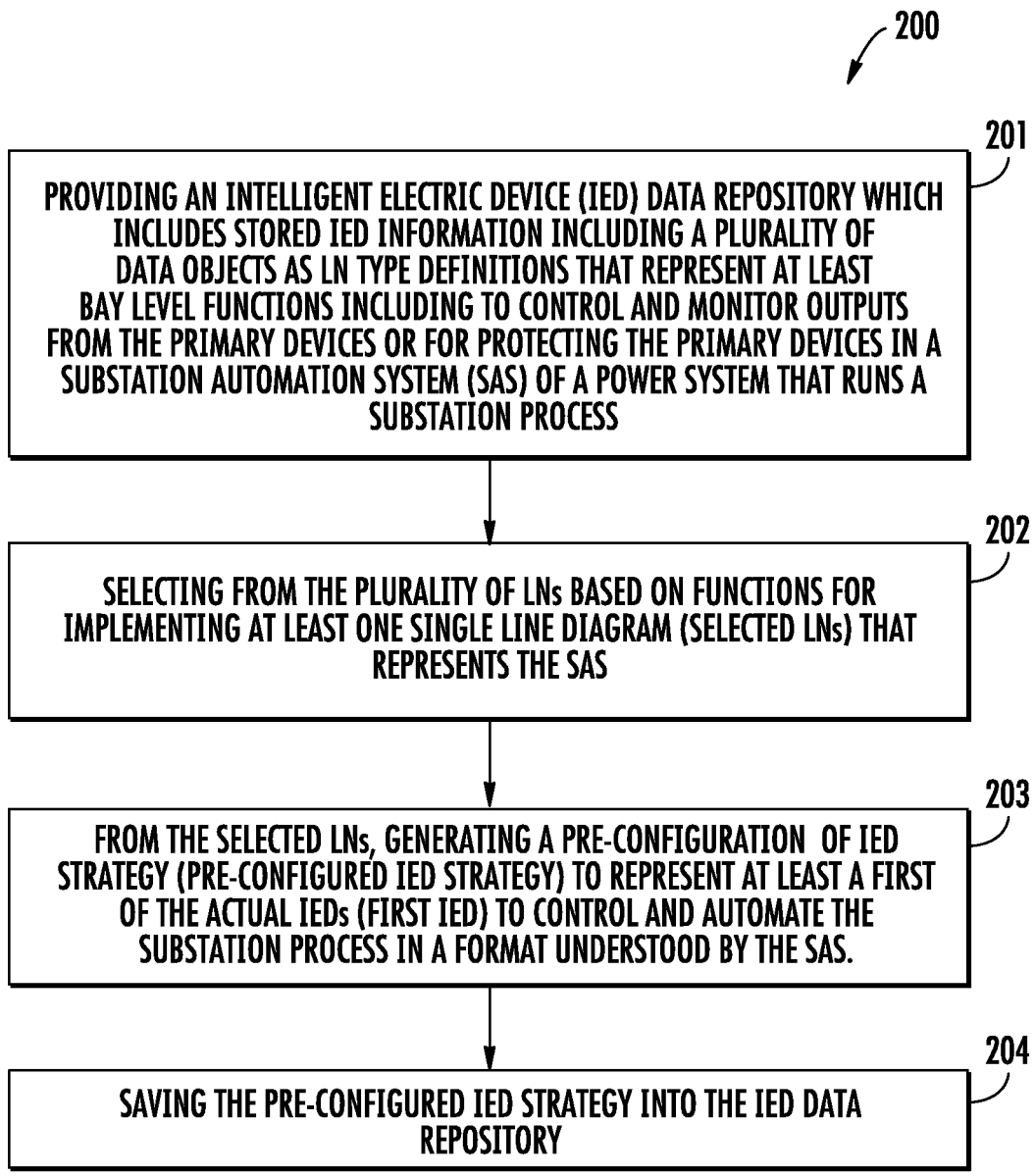
FIG. 2 is a flow chart that shows steps in a method of configuring actual IEDs into a SAS of a power system that runs a substation process, according to an example embodiment.

FIG. 2 is a flow chart that shows steps in a method 200 of configuring actual IEDs into a SAS of a power system that runs a substation process, according to an example embodiment. Method 200 can be applied to SAS 100 described above, where SAS 100 generally has multiple process controllers and field devices (as primary devices) which are connected to one another via communication buses.

Step 201 comprises providing an IED data repository which includes IED information comprising a plurality of LNs each having a plurality of data objects as LN type definitions. As described above, the data objects in each LN represent the operational parameters, device status, diagnostic information, or device configuration information described by signal lists of substation automation. Each data object is associated with one stored common data class which describes data types such as integer, String, Boolean, etc. according to an electrical substation automation standard, such as the IEC 61850 standard. The LNs may describe, for example, interlocking and control functionality within a substation.

Step 202 comprises selecting from the LNs stored in the IED data repository (e.g., see IED data repository 321 in FIG. 3 described below) to provide selected LNs based on functionality needed to implement at least one single line diagram (selected LNs) which represents the SAS. The LN Type Generator 322 can provide the option to the user (e.g., system engineer) to select the LNs based on the single line diagram(s) for the SAS. Alternatively, the LNs can be selected automatically from the single line diagram(s) for the SAS.

Step 203 comprises from the selected LNs, generating a pre-configuration of IED strategy (pre-configured IED strategy) to represent at least one actual IED (and generally a plurality of IEDs including different IED types from different IED vendors) to control and automate the substation process in a format understood by the SAS. The selected LNs are used for configuring a pre-configuration of IED strategy (pre-configured IED strategy). The pre-configured IED strategy is generated in a format understood by the SAS (e.g., XML file, text file, or binary file format). Step 204 comprises saving the pre-configured IED strategy into the IED data repository. This enables the system engineer to use the pre-configured IED strategies without the need to identify the actual (physical) IEDs that will be used in the SAS.

The system engineer or other user can procure the necessary IEDs from their vendor (or manufacturer) based on the pre-configured IED strategies and IED supported functionalities. Once the actual IEDs are installed, the system engineer can follow the steps described below to convert the pre-configured IED control strategies to the actual runtime IED strategies. The conversion can be achieved in one of the two example ways option 1 (online) and option 2 (offline) as described below.

In option 1, an "IED online configuration tool" (see IED online configuration block 326 in FIG. 3 described below) is provided which identifies and lists all IEDs available on the IEC 61850 network. On user' confirmation, the IED online configuration tool uploads the IED (read from the physical IED on the network) into the pre-configured IED strategy. The IED online configuration tool can have the features to automatically associate an IED in the network with a matching pre-configured IED strategy.

In option 2, an "IED offline configuration tool" is provided (see the IED offline configuration block 327 in FIG. 3 described below) which takes the SCD file containing configuration and list of all the IEDs defined in the file. The IED offline configuration tool can provide the option to the user to select a SCD file from the list and associate with the pre-configured TED strategy. On user' confirmation, the IED offline configuration tool (see the IED configuration system 320 in FIG. 3 described below) will upload the IED configuration (read from the SCD file) into the pre-configured IED strategy.

Figure 3:
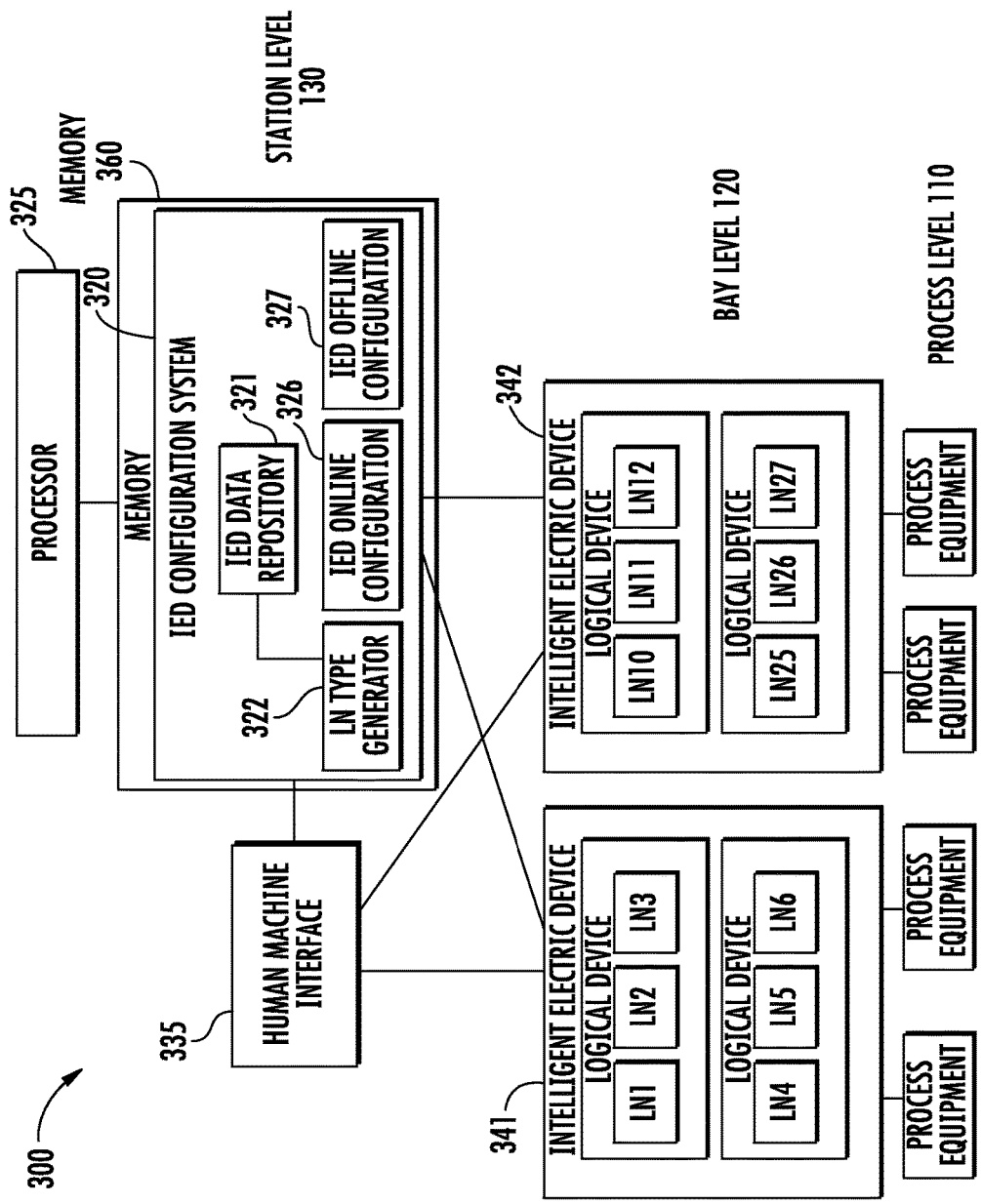
FIG. 3 is a block diagram of a portion of a SAS showing a disclosed IED configuration system and its result from implementing a disclosed method for configuring the actual IEDs shown, according to an example embodiment.

FIG. 3 is a block diagram of a portion of a three-level SAS 300 showing a disclosed TED configuration system 320 and its result from implementing a disclosed method for configuring actual TEDs, according to an example embodiment. SAS 300 includes a station level 130, a bay level 120, and a process level 110. A processor 325 has an associated memory 360 which includes code for implementing a disclosed IED configuration system 320 is shown at the station level 130 that includes an IED data repository 321, and an LN type generator tool (LN type generator) 322.

The TED configuration system 320 also includes and IED online configuration block 326 and an IED offline configuration block 327. A user interface is provided that is shown as a Human Machine Interface (HMI) 335 that is coupled for monitoring the IEDs shown as IED 341 and 342 in the field. As shown in FIG. 3, the HMI 335 is connected to IED configuration system 320 to permit a system operator using the HMI 335 to configure the IEDs by using IED configuration system 320, and to monitor the current state of IEDs 341 and 342.

The IED configuration system 320 generally includes a memory shown as associated memory 360 (e.g., static random access memory (SRAM)) for hosting the IED data repository 321 to store IED configuration information including LN classes, and LN type definitions that include a plurality of data objects which represent at least bay level functions for online and/or offline IED configuration. The IED configuration system 320 may be resident on a single computer, or may be resident on two or more computers and be interconnected by a communications network. The memory may be co-resident with the IED configuration system 320 or it may be at separate location or comprise a removable storage device.

In a selecting step (step 202 described above), the LN type generator 322 lists all the LNs (say LN1 to LN40) that are defined in the IED data repository, and selected LNs are chosen based on Single Line Diagram(s) that represent a given SAS. The LN type generator 322 provides the option to the user to select the LNs based on functions identified in the Single Line Diagram(s), or the LN selections can be made automatically. In a generating step (step 203 described above) from the selected LNs, a pre-configuration of IED strategy (pre-configured IED strategy) is generated to represent at least one actual IED (and generally a plurality of different IED types from different IED vendors) to control and automate the substation process in a format understood by the SAS. LN type generator 322 saves the pre-configured IED strategy definitions into the IED data repository 321 (step 204). This enables the system engineer or other user to use the pre-configured IED strategies in the IED data repository 321 for system configuration to generate IED configurations from a plurality of the pre-configured IED strategies to define the IEDs without the need to identify the actual (physical) IEDs that will be used in the SAS.

IED 341 is shown represented by a first logical device that includes LN1, LN2 and LN3, and a second logical device that includes LN4, LN5 and LN6. IED 342 is shown represented by a third logical device that includes LN10, LN11 and LN12, and a fourth logical device that includes LN25, LN26, and LN27. The IED representations represent actual runtime IED control strategies. The IED configuration system 320, the IEDs 341, 342, and the HMI 335 are only some of the elements that may form a practical SAS system. Such a SAS system may include other elements as well, such as shown in FIG. 1, without departing from the scope of this Disclosure. Advantages of disclosed embodiments include:
1. Supporting a one-time SAS configuration which minimizes redundant tasks and reworks. Any changes in the physical (actual) IED version can allow modifying the IED strategies without removing and re-creating the entire IED configuration.
2. Disclosed solutions enable important project benefits such as late binding of automation systems to physical IED hardware and equipment, flexible hardware procurement that improves agility and enhanced design options as there is no need for the physical IED to perform pre-configuration.
3. Disclosed methodology relies on separating physical IED from functional design, allowing parallel workflows, using standardized designs, and enabling engineering to be done.
4. Disclosed methodology can result in improved capital savings and better scheduling for large automation projects as there is no need to await receiving of the actual IEDs.

EXAMPLES

Disclosed embodiments are further illustrated by the following specific Examples, which should not be construed as limiting the scope or content of this Disclosure in any way.

Figure 4:
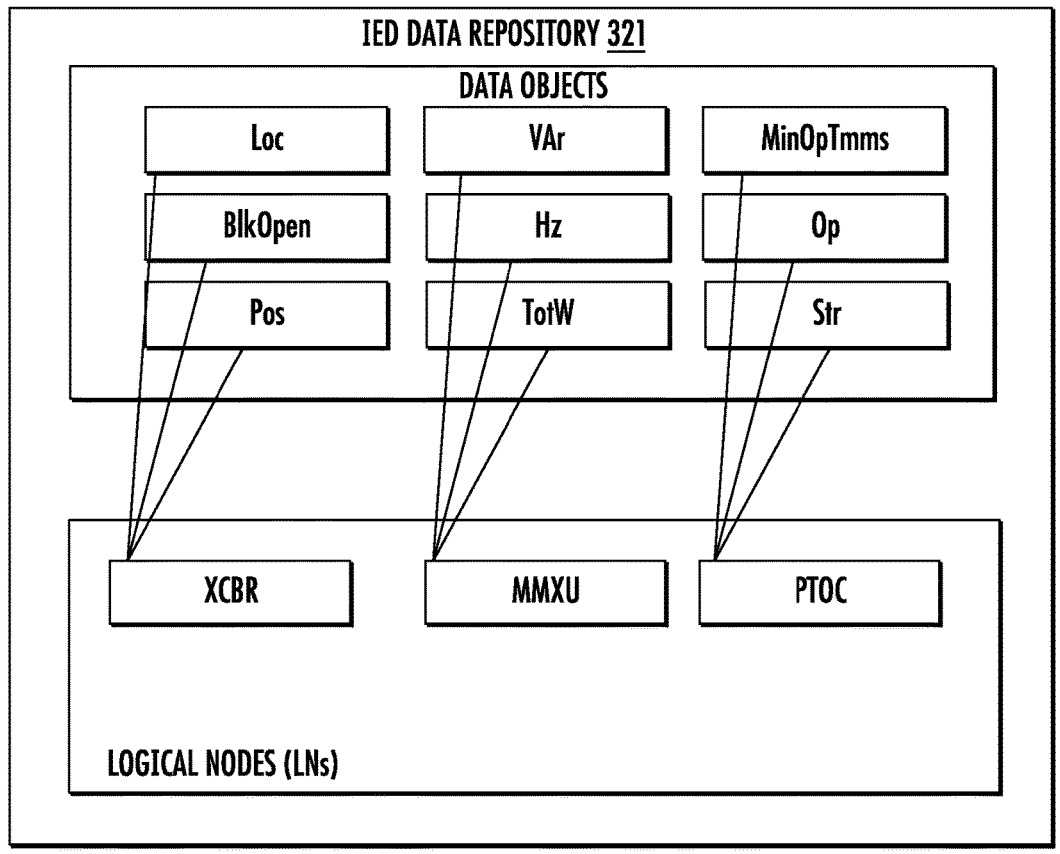
FIG. 4 is diagrammatic representation for an IED data repository which stores IED information for configuring a plurality of different types of actual IEDs including a plurality of LNs, according to an example embodiment.

FIG. 4 is diagrammatic representation for an IED data repository 321 which stores IED information for configuring a plurality of different ones (types) of actual IEDs including a plurality of LNs. Each LN includes a plurality of data objects as LN type definitions that represent at least bay level functions including to control and monitor outputs from the primary devices and for protecting the primary devices. As described above, the data objects in the LN represent the operational parameters, device status, diagnostic information, or device configuration information described by signal lists of substation automation.

IED data repository 321 is for configuring an IEC 61850 complaint IED for example, but not limited to, the IED types being a switching and protection relay IED and a metering and measuring IED. Each LN shown (shown as XCBR, MMXU, and PTOC) represents a plurality of data objects, with 3 data objects for each LN as shown in FIG. 4. The circuit breaker LN shown as XCBR has associated data objects being Pos—Switch Position, BlkOpen—Block opening, Loc—Local) operation. Each data object is associated with one common data class defined in an electrical substation automation standard, for example, for the IEC 61850 standard. Each of the data objects for a given LN can be from all different common data classes or any combination including all the same common data class.

As shown LNs are XCBR—Circuit breaker; Data Objects: Pos—Switch Position, BlkOpen—Block opening, Loc—Local operation; MMXU—Measuring unit. Data Objects shown are TotW—Total active power (total P), Hz—Frequency, VAr—Phase reactive power (Q); PTOC—Time overcurrent protection; Data Objects: Str—Start Op—Operate, MinOpTmms—Minimum operate time.

XCBR has a 'Pos' (Position) data object which is associated with Controllable double point (CDP) common data class. Similarly, the 'BlkOpn' data object of the XCBR LN is associated with a controllable single point (SPC) common data class. As shown in FIG. 4, for example, the 'Pos' data object of the XCBR LN is of type controllable double point (CDP) data class. This CDP data class includes 14 data fields (some are mandatory per the electrical substation automation standard and need to be present, while others are optional). The StVal field contains the value of the Circuit breaker. Similarly, IED repository 321 includes other data objects of other LNs which are associated with a pre-defined set of data classes defined in an electrical substation automation standard.

Figure 5:
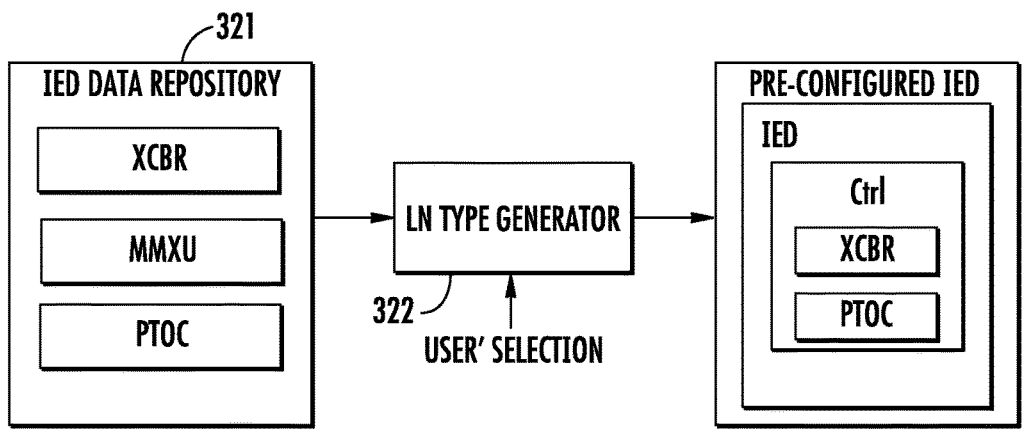
FIG. 5 illustrates an example method for an example LN Type Generator for a user selecting LNs to generate a pre-defined IED strategy by grouping the LNs "inside" one logical device, according to an example embodiment.

FIG. 5 illustrates an example method for an example LN Type Generator 322 for a user selecting LNs to generate a pre-defined IED strategy by grouping the LNs "inside" one LD. In this simplified example the user selects 2 of the 3 LNs shown based on a single line diagram. However, as described above, the LN selections can comprise automatic selection based on the single line diagram(s) for the SAS. At an initial level of design, a pre-configured IED strategy is generated for the selected LNs as described above relative to FIG. 3, and the conversion of pre-configured IED strategy to an actual runtime IED may be initiated at least in two ways (option 1 and option 2). The operator of the system may initiate the online IED configuration tool to select an IED from the list and associate it with a preconfigured IED strategy, or initiate an offline IED configuration method by selecting an SCD file from the list and associate it with a preconfigured IED strategy.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

The invention claimed is:
1. A method of configuring actual Intelligent Electronic Devices (IEDs) into a substation automation system (SAS) of a power system that includes process equipment including primary devices that run a substation process, comprising:
providing an IED data repository which stores IED information including a plurality of logical node classes (LNs) with each said LN including a plurality of data objects as LN type definitions that represent at least bay level functions including to control and monitor outputs from said primary devices or for protecting said primary devices;
selecting from said plurality of LNs based on functions for implementing at least one Single Line Diagram (selected LNs) which represents said SAS; from said selected LNs,
generating a pre-configuration of IED strategy (pre-configured IED strategy) to represent at least a first of said actual IEDs (first IED) to control and automate said substation process in a format understood by said SAS, and saving said pre-configured IED strategy into said IED data repository.

2. The method of claim 1, wherein said selecting comprises automatic selection.

3. The method of claim 1, wherein said selecting comprises manual selection.

4. The method of claim 1, further comprising converting said pre-configured IED strategy into an actual runtime IED including creating a configuration for said first IED (first IED configuration).

5. The method of claim 4, wherein said converting comprises obtaining a substation configuration description (SCD) file, then associating said SCD file to said pre-configured IED strategy, and using said SCD file to upload said first IED configuration by reading from said SCD file into said pre-configured IED strategy.

6. The method of claim 4, wherein said converting comprises connecting online to said first IED that supports said bay level functions to an IED configuration system that implements said method, then associating said first IED with an IED instance to upload said first IED configuration by reading from said first IED over a network into said pre-configured IED strategy.

7. The method of claim 1, wherein said plurality of data objects are each associated with one stored common data class which describes a data type according to an electrical substation automation standard.

8. The method of claim 1, wherein said format comprises Extensible Markup Language (XML), a text file, or a binary file.

9. The method of claim 1, wherein said first IED comprises a plurality of said IEDs including different IED types from different IED vendors.

10. An Intelligent Electronic Device (IED) configuration system for configuring actual IEDs into a substation automation system (SAS) of a power system that includes process equipment including primary devices that run a substation process, comprising:
   a computing device including a processor and code stored in an associated memory for hosting an IED data repository for storing IED information for including a plurality of logical node classes (LNs) with each said LN including a plurality of data objects as LN type definitions that represent at least bay level functions including to control and monitoring outputs from said primary devices or for protecting said primary devices; said code executed by said processor for implementing:
   an LN type generator tool (LN type generator) for selecting from said plurality of LNs based on functions for implementing at least one Single Line Diagram (selected LNs) which represent said SAS; from said selected LNs, generating a pre-configuration of IED strategy (pre-configured IED strategy) to represent at least a first of said actual IEDs (first IED) to control and automate said substation process in a format understood by said SAS; saving said pre-configured IED strategy into said IED data repository;
   converting said pre-configured IED strategy into an actual runtime IED including creating a configuration for said first IED (first IED configuration), said converting comprising at least one of:
      (i) an IED online configuration block for connecting online to said first IED that supports said bay level functions to said IED configuration system, then associating said first IED with an IED instance to upload said first IED configuration by reading from said first IED over a network into said pre-configured IED strategy, and
      (ii) an IED offline configuration block for processing a received substation configuration description (SCD) file, then associating said SCD file to said pre-configured IED strategy, and using said SCD file to upload said first IED configuration by reading from said SCD file into said pre-configured IED strategy.

11. The system of claim 10, wherein said selecting comprises automatic selection.

12. The system of claim 10, wherein said system includes said (i) and said (ii).

13. The system of claim 10, wherein said plurality of data objects are each associated with one stored common data class which describes a data type according to an electrical substation automation standard.

14. The system of claim 10, wherein said first IED comprises a plurality of said IEDs including different IED types from different IED vendors.

* * * * *